US010985797B2

(12) United States Patent
Rodenbeck et al.

(10) Patent No.: US 10,985,797 B2
(45) Date of Patent: Apr. 20, 2021

(54) BLOCKER-RESILIENT BROADBAND WIRELESS TRANSCEIVERS WITH MULTI-USER COLLISION TOLERANCE BASED ON MIXED-MODE CORRELATION

(71) Applicant: The Government of the United States of America, as represented by the Secretary of the Navy, Arlington, VA (US)

(72) Inventors: Christopher T. Rodenbeck, Annandale, VA (US); Jose Silva-Martinez, College Station, TX (US); Aydin I. Karsilayan, College Station, TX (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/235,460

(22) Filed: Dec. 28, 2018

(65) Prior Publication Data
US 2019/0207643 A1    Jul. 4, 2019

Related U.S. Application Data

(60) Provisional application No. 62/611,093, filed on Dec. 28, 2017.

(51) Int. Cl.
| | |
|---|---|
| *H04B 1/69* | (2011.01) |
| *H04B 1/40* | (2015.01) |
| *H04B 1/707* | (2011.01) |
| *H04B 1/525* | (2015.01) |
| *H04B 1/00* | (2006.01) |
| *H04B 1/709* | (2011.01) |

(52) U.S. Cl.
CPC ............. *H04B 1/69* (2013.01); *H04B 1/0028* (2013.01); *H04B 1/40* (2013.01); *H04B 1/525* (2013.01); *H04B 1/707* (2013.01); *H04B 1/709* (2013.01)

(58) Field of Classification Search
CPC ...... H04B 1/38; H04B 1/3827; H04B 1/3833; H04B 1/40; H04B 1/69; H04B 1/707; H04B 1/709; H04B 1/7115; H04B 1/0028; H04B 1/525
USPC ................ 370/130, 140–142, 150, 335, 342; 375/130, 140–142, 150; 708/250, 708/253–256
See application file for complete search history.

(56) References Cited

U.S. PATENT DOCUMENTS

| | | | |
|---|---|---|---|
| 6,307,877 B1 * | 10/2001 | Philips ...................... | G06F 8/10 375/130 |
| 2004/0057538 A1 * | 3/2004 | Sathiavageeswaran ..................... | H04B 1/7117 375/350 |
| 2005/0180491 A1 * | 8/2005 | Hiromori .............. | G01S 13/325 375/142 |

(Continued)

*Primary Examiner* — Young T. Tse
(74) *Attorney, Agent, or Firm* — US Naval Research Laboratory; William P. Ladd

(57) ABSTRACT

Systems, devices, and methods are provided for mixed-mode signal processing that achieves unprecedented levels of out-of-band and in-band interference suppression. Embodiments of the present disclosure mitigate the effects of blockers and jammers, which have surfaced as issues in emerging cognitive radio systems as those networks struggle to co-exist with licensed and unlicensed users.

20 Claims, 11 Drawing Sheets

(56) References Cited

U.S. PATENT DOCUMENTS

| | | | |
|---|---|---|---|
| 2007/0025424 A1* | 2/2007 | Hahm | H04B 1/7115 375/144 |
| 2007/0155314 A1* | 7/2007 | Mohebbi | H04B 7/15507 455/11.1 |
| 2009/0232190 A1* | 9/2009 | Yoshizawa | H04J 13/00 375/146 |
| 2010/0086304 A1* | 4/2010 | Mizutani | H04J 14/0282 398/71 |
| 2016/0087658 A1* | 3/2016 | Weissman | H04B 1/10 455/78 |
| 2016/0235301 A1* | 8/2016 | Melodia | G08C 23/02 |
| 2018/0040964 A1* | 2/2018 | Benjebbour | H01Q 3/26 |

* cited by examiner

The signal comes back to the RX, but with an interfering tone (at a 2 MHz offset.)

BLOCKER-RESILIENT BROADBAND WIRELESS TRANSCEIVERS WITH MULTI-USER COLLISION TOLERANCE BASED ON MIXED-MODE CORRELATION

CROSS REFERENCE TO RELATED APPLICATIONS

This application claims the benefit of U.S. Provisional Patent Application No. 62/611,093, filed on Dec. 28, 2017, which is incorporated by reference herein in its entirety.

FIELD OF THE DISCLOSURE

This disclosure relates to transceivers, including wireless transceivers.

BACKGROUND

Improving the tolerance of wireless communications systems to intentional and unintentional interference and improving system co-existence among multiple users are issues of primary interest for homeland security and consumer electronics products. The effects of blockers and jammers have surfaced as issues in emerging cognitive radio systems as those networks struggle to co-exist with licensed and unlicensed users.

Cognitive radio networks are broadband by nature since the spectrum holes needed for these radios to operate can be anywhere in both time and frequency domains. Despite the technological challenges, government and industry have begun to seriously consider using cognitive radio systems as an option to maximize the use of available spectrum. Access to spectrum is an increasingly important asset for economic growth. In particular, the accelerating demand for spectrum in the area of mobile information technology requires urgent solutions to enable further commercial development.

However, most of the spectrum is already assigned to federal and commercial applications, especially the golden band for wireless communication between 1 GHz and 6 GHz. Continuous efforts have been made to make better use of the spectrum. The unsuccessful 11-band MB-OFDM proposal for 3.4-10.7 GHz ultra-wideband (UWB) communications was designed to implement high data rate wireless devices, and it was one of the first spectrum sharing proposals. This approach intended to use frequency bands of 528 MHz with OFDM-QPSK modulation and fast hopping between the bands of a given band group. Unfortunately, the power consumption required for these applications was well above the preliminary estimations, then drastically limiting the benefits of that technology.

The evolution of UWB communication culminated in the cognitive radio concept, in which the system can exploit the sparsity of the spectrum by operating opportunistically in underutilized bands, including several bands assigned to federal use. Naval surface radars are a prominent example of underutilized spectrum of great commercial interest. These radars operate in the prime 5-band spectrum and are pulsed to transmit tremendous peak power, but the use of the spectrum is intermittent. This spectrum can be employed for other applications. The report provided by the President's Council of Advisors on Science and Technology (PCAST) states that making wireless spectrum available is essential to the rapid growth of the economy; however, it cannot compromise national security and public safety.

The solution envisioned by PCAST is to share a broad frequency spectrum devoted to federal applications to accommodate a wide variety of commercial applications. This approach opens the gate for innovative solutions and promotes the development of new technologies. The strong recommendation provided by PCAST was to identify and share (with licensed and unlicensed users) a wide bandwidth of underutilized Federal spectrum, which requires new management policies for coexistence of federal, commercial and general users. This initiative offers opportunities to locally exploit the federal spectrum and to develop blocker-resilient transceivers and innovative modulation techniques for coexistence of multiple standards that will be crucial for effective sharing of the spectrum.

The shared access to the federal spectrum will be based on a three-tier hierarchy: (i) primary users consist of federal systems having the highest priority and protection from interference caused by the secondary and general users; (ii) secondary users have priority operating rights through commercial systems with interference protection from general users; and (iii) general users are allowed opportunistic access to unoccupied spectrum. General users are required to have the capability to operate on multiple bands, and preferably, they should be equipped with multi-standard transceivers with interference mitigation capabilities.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 4:
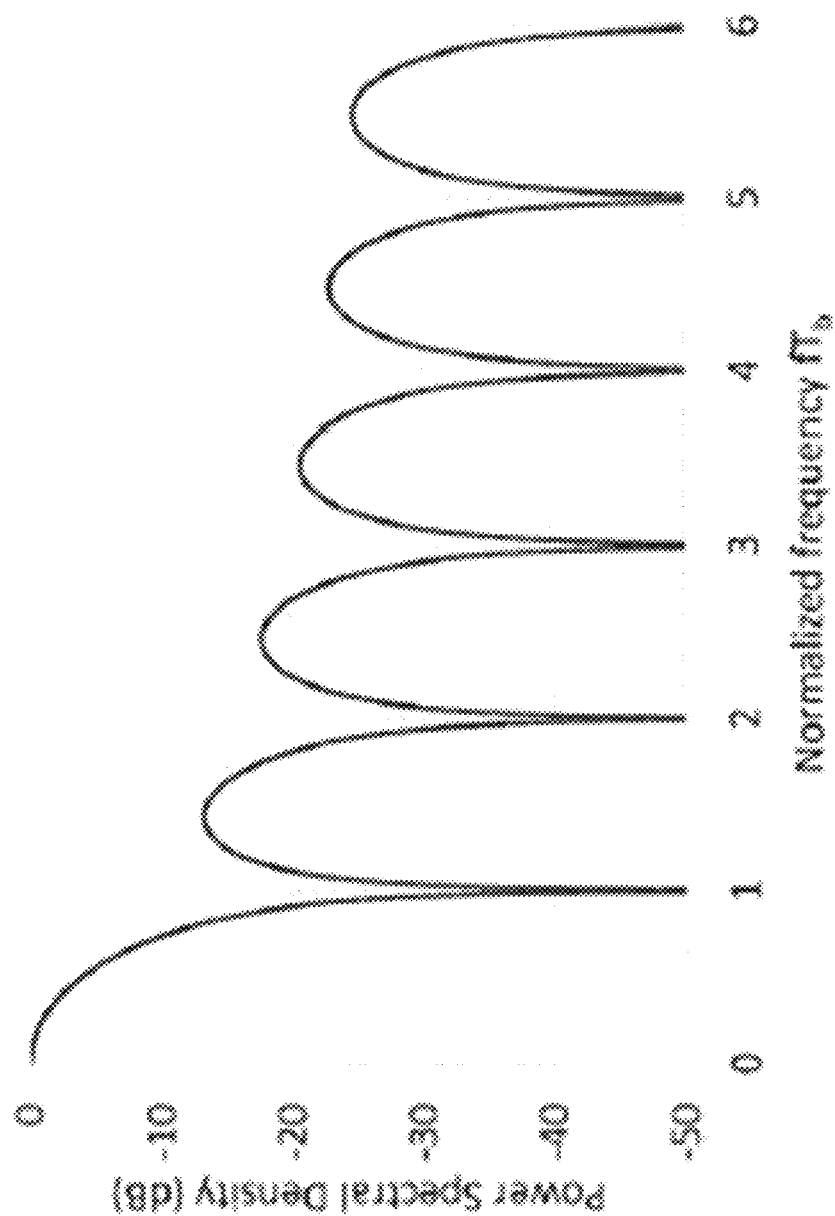
Figure 5:
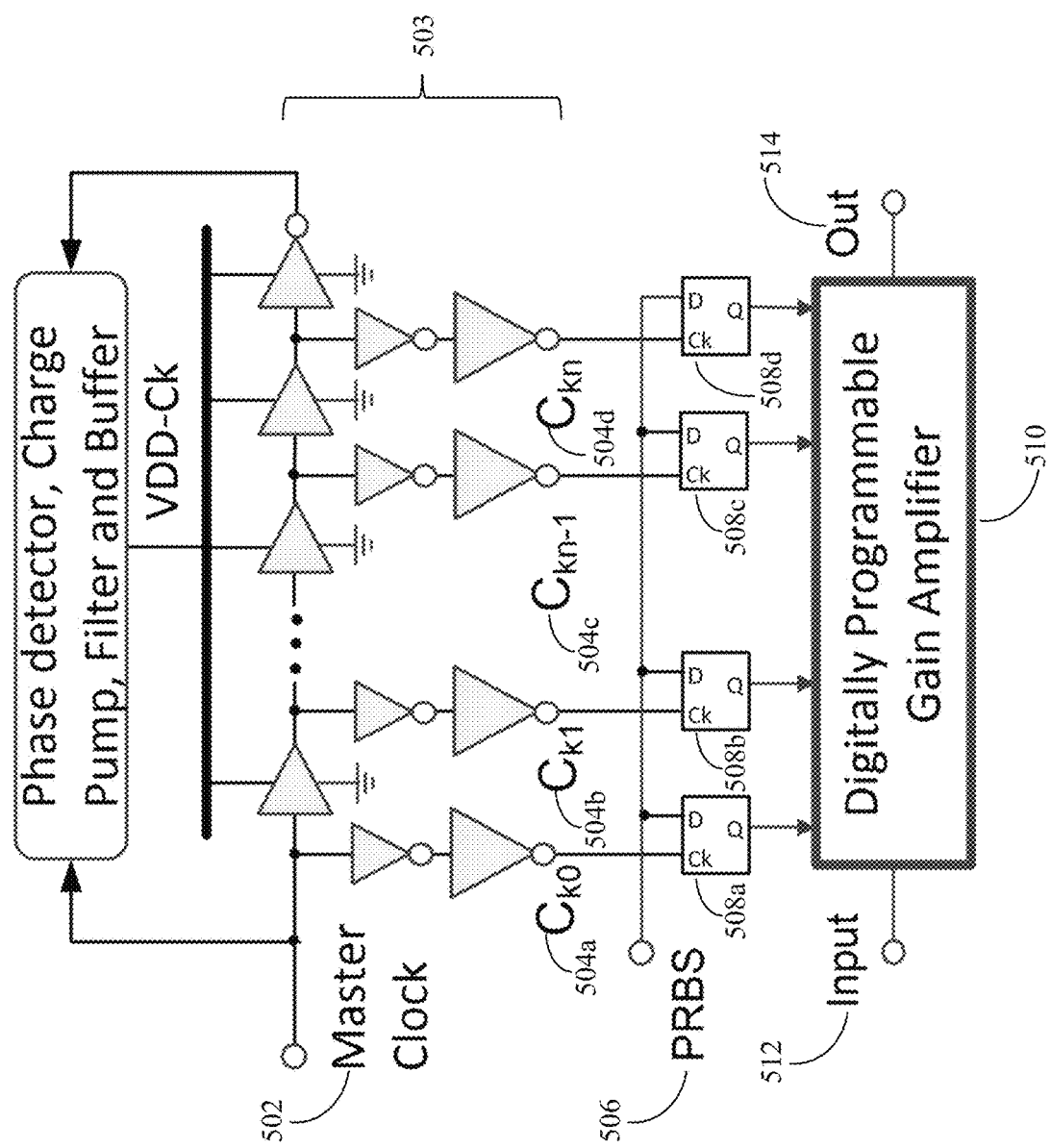
Figure 6:
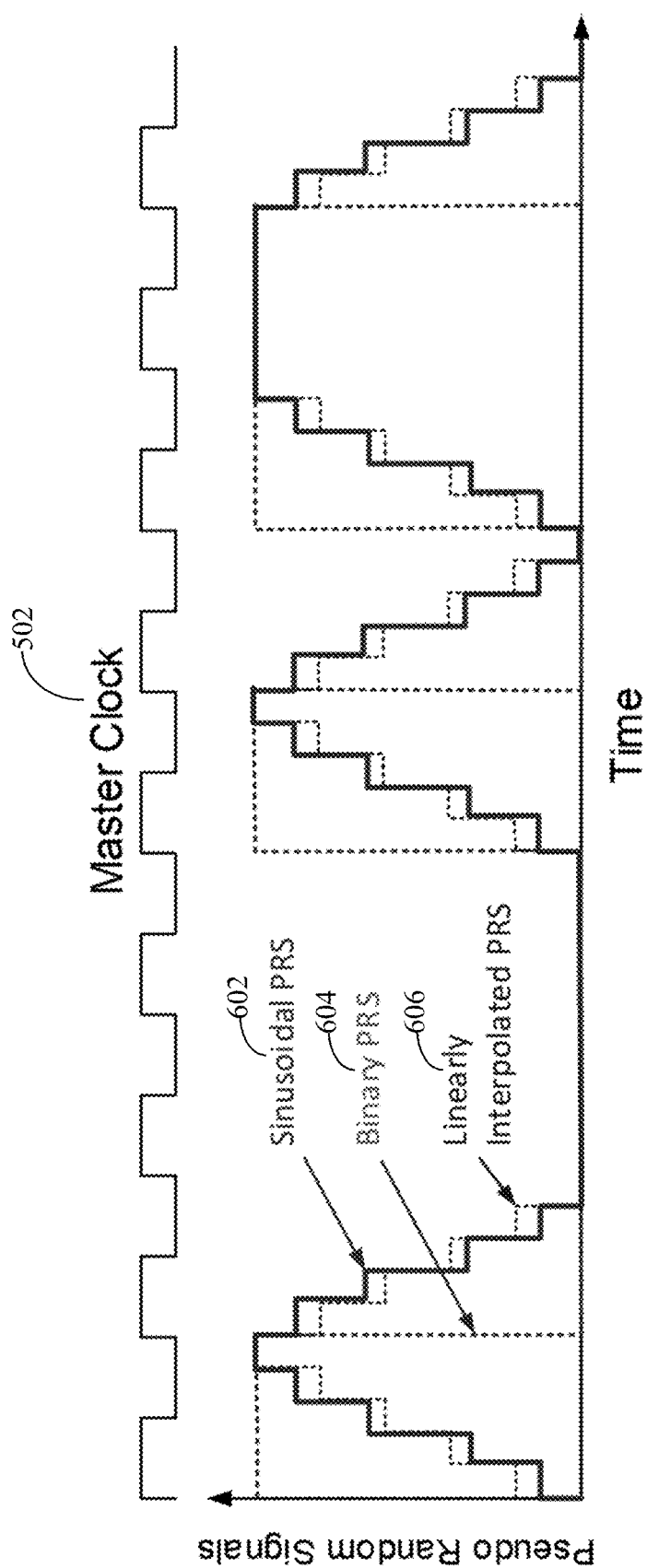
Figure 7A:
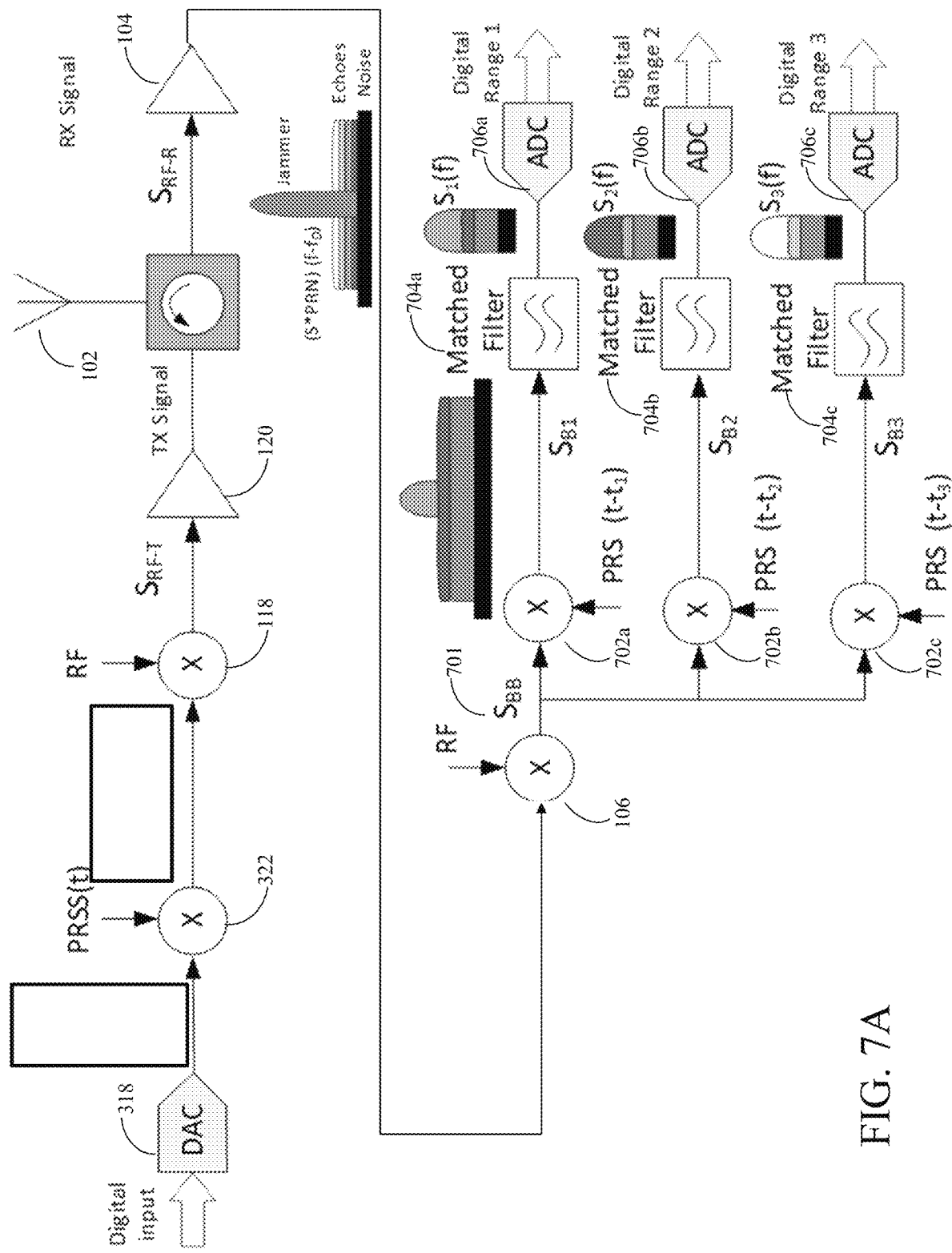
Figure 7B:
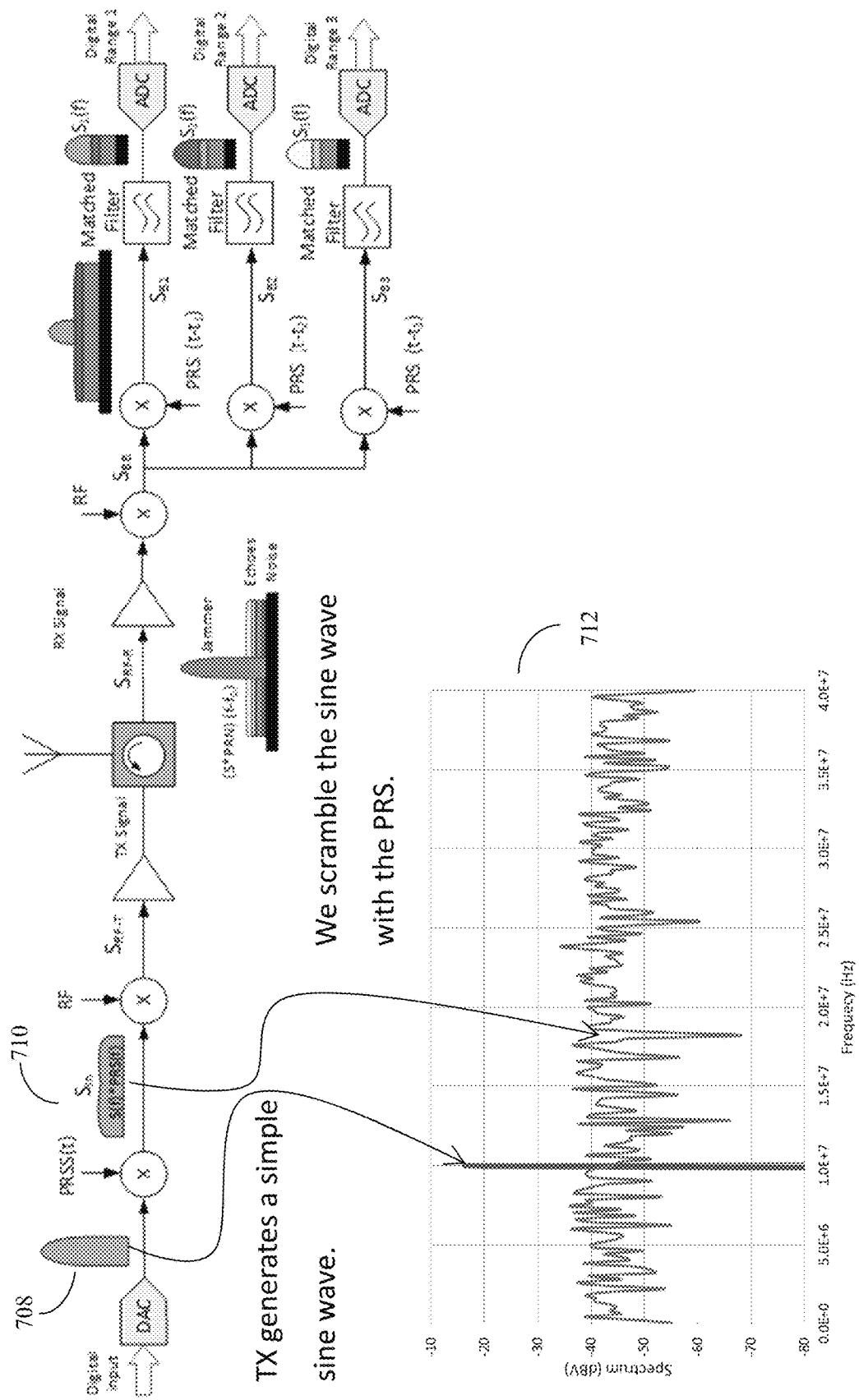
Figure 7C:
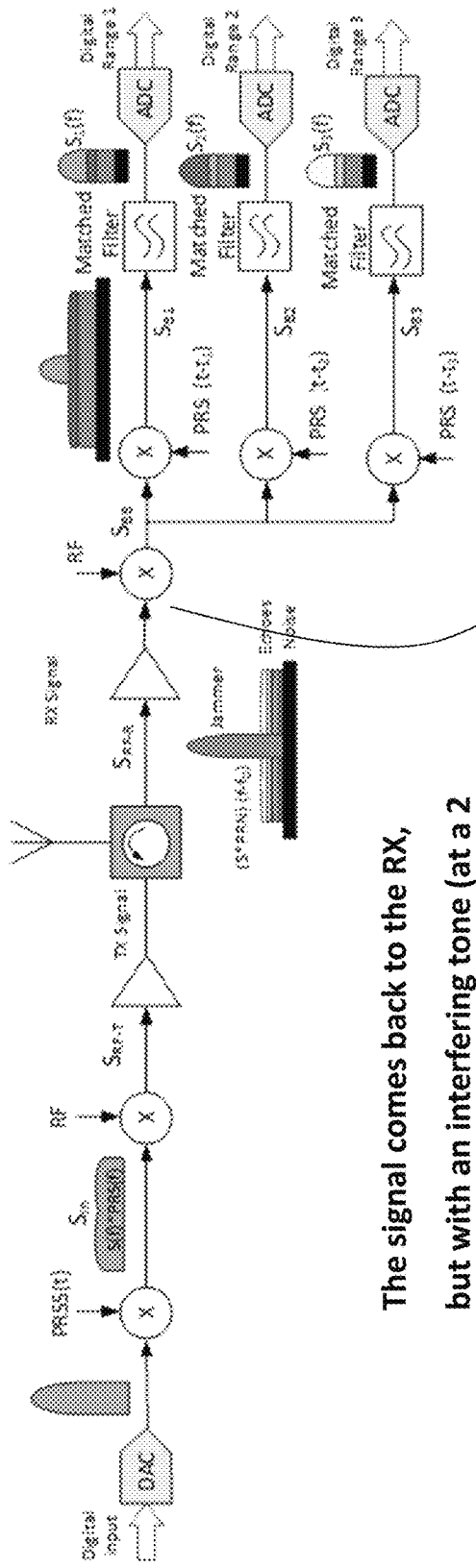
Figure 7C:
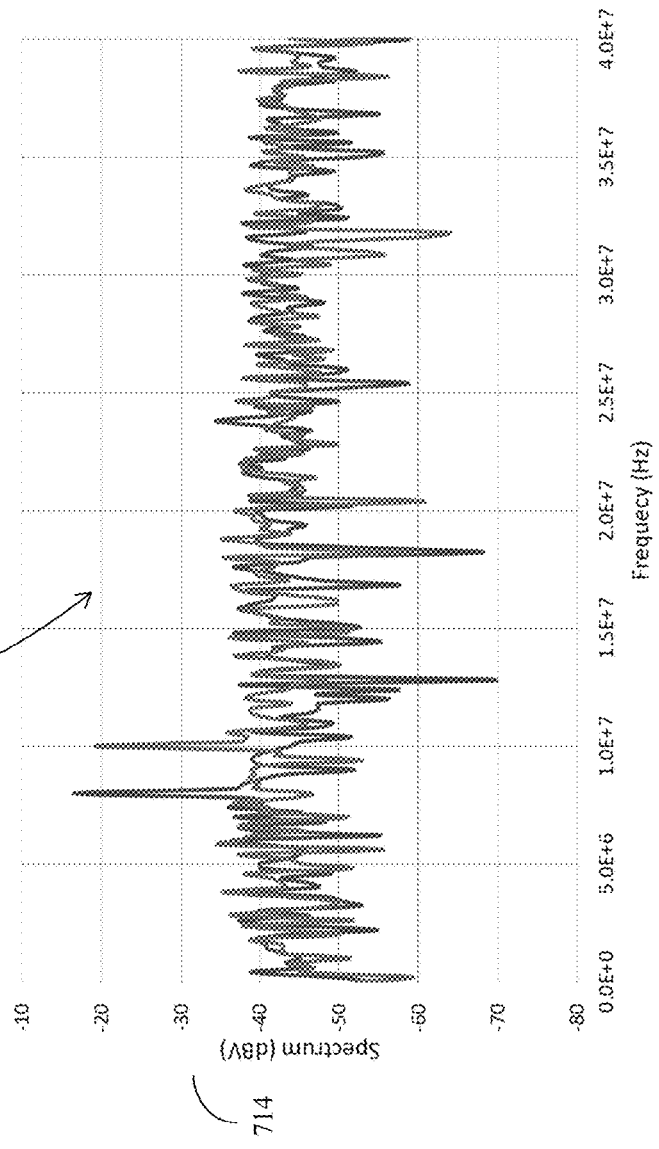
Figure 7D:
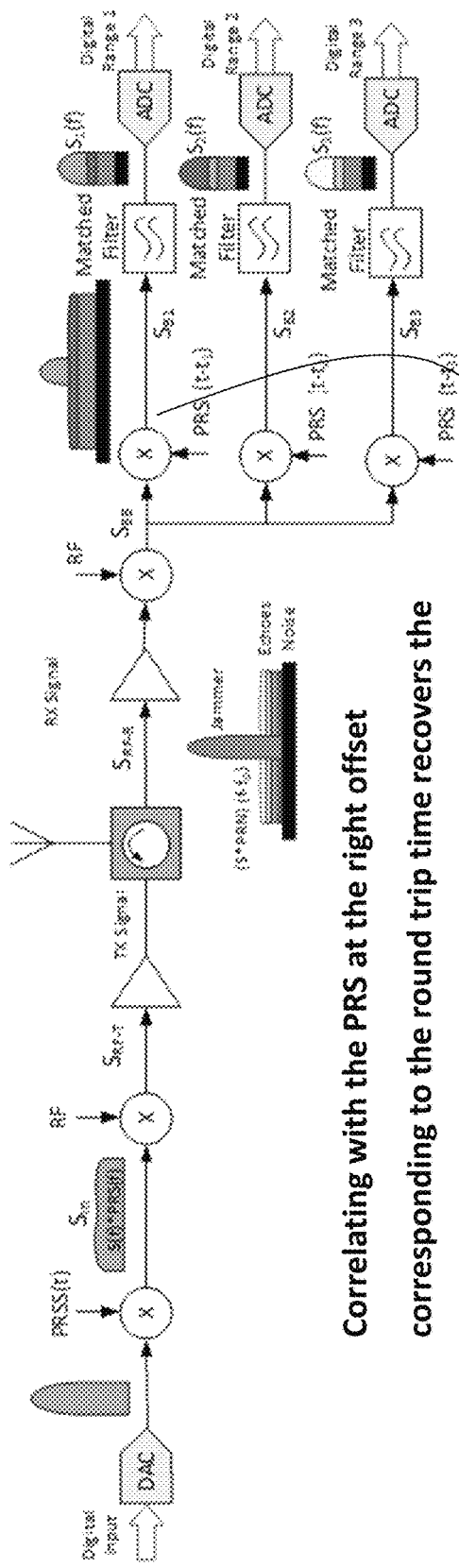
Figure 7D:
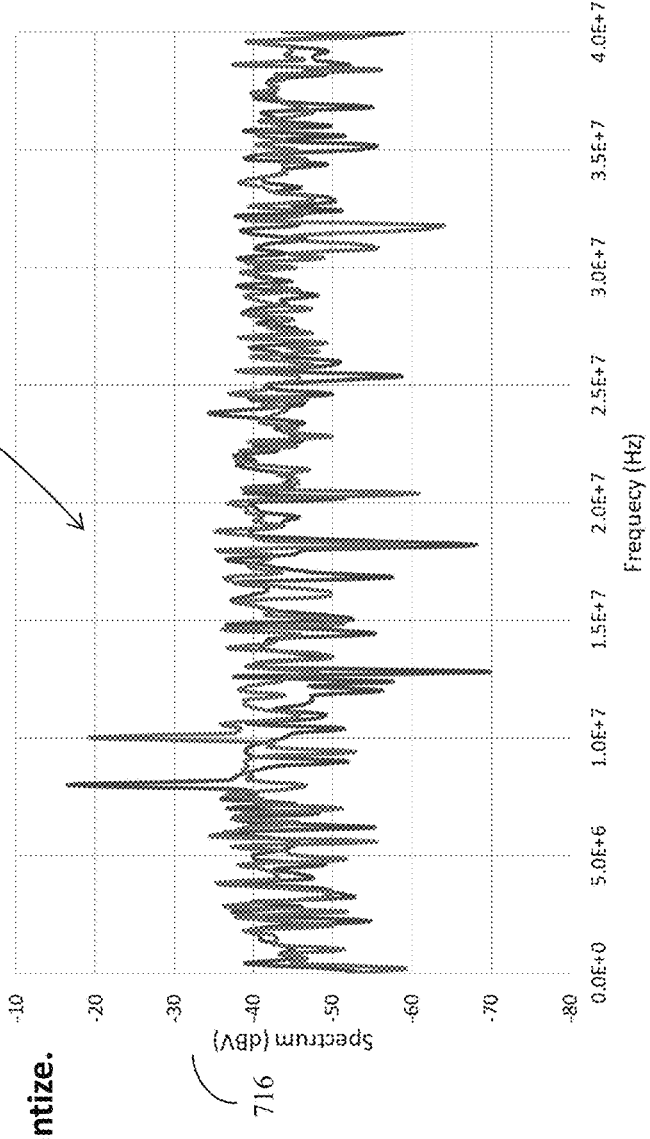
Figure 8:
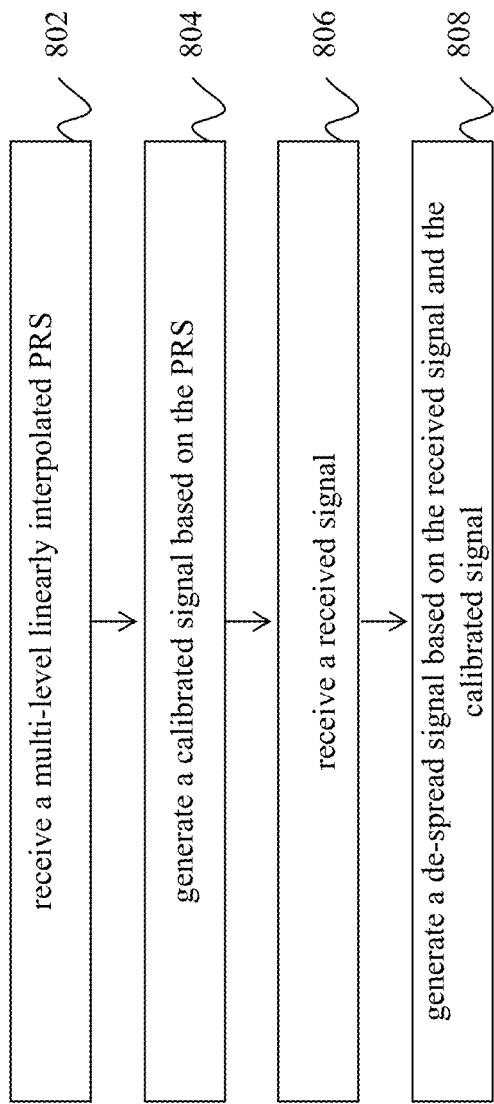

FIG. 4. is a diagram of an exemplary spectrum of a pseudo-random signal in accordance with an embodiment of the present disclosure;

FIG. 5 is a diagram of an exemplary modulator employing a pseudo-random mixer-mode sequence in accordance with an embodiment of the present disclosure;

FIG. 6 is a diagram showing exemplary waveforms for a conventional pseudo-random binary sequence (PRBS) and for a multi-level linearly interpolated pseudo-random sequence (PSR) in accordance with an embodiment of the present disclosure;

FIGS. 7A-7D are diagrams illustrating an exemplary complementary metal-oxide-semiconductor (CMOS) implementation of an embodiment of the present disclosure; and FIG. 8 is an exemplary method for de-spreading a received signal using a multi-level linearly interpolated PRS in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

Embodiments of the present disclosure address several challenges towards the realization of the first shared spectrum superhighway. Embodiments of the present disclosure are based on a dual-mode system, which relies on spreading the transmit signal within frequency and time domains. In addition to the conventional spread-spectrum techniques used in the digital domain, a second frequency-domain convolution can be performed in the analog domain to spread the desired signal before transmitting it. At the receiver, a de-spreading operation can be carried out to compress the desired signal while spreading the spectrum of all other signals.

In an embodiment, to recover the information, the receive signal and the de-spreading signal can be synchronized in time, which increases the complexity of the receiver, but at the same time allows blocker rejection to be increased and user collision avoidance to be improved. In an embodiment, an innovative low-distortion, highly-linear, noninvasive, analog filtering reduces the power of out-of-band blockers before the analog-to-digital conversion.

A major disadvantage of spread spectrum techniques is the excessive demand of signal bandwidth. When using a pseudo-random binary sequence (PRBS), the spectrum required can be as high as 4 to 5 times the master frequency of the clock used for the generation of the PRBS. Embodiments of the present disclosure overcome this serious limitation. In an embodiment, to relax the baseband filtering and data converter requirements, the second PRBS modulation provides a lower peak-to-average ratio even with the existence of blockers.

Embodiments of the present disclosure improve systems co-existence and resilience to out-of-band and in-band blockers. Embodiments of the present disclosure provide a transceiver architecture with superior bandwidth efficiency enabling the use of a mixed-mode spread-spectrum technique. Embodiments of the present disclosure enable the harmonious co-existence of multiple secondary users sharing the broadband analog spread-spectrum system with outstanding blocker rejection properties and higher tolerance to user collisions. Embodiments of the present disclosure apply to both radar architectures and cognitive radio networks, thereby contributing toward the co-existence of federal and commercial systems to further optimize the use of the shared spectrum.

In an embodiment, cognitive radio can be used to increase spectrum utilization by allowing opportunistic communications systems to: (1) coexist with traditional primary and secondary users; and (2) take advantage of sparsity in federal bands. Several challenges arise since the broadband nature of the shared spectrum demands higher than ever resilience to all types of jammers. Specifically, in an embodiment, the cognitive receiver's RF front-end and ADC have significantly improved tolerance to strong in-band and out-of-band blockers to maintain functionality under all operating conditions. Digital domain spread-spectrum techniques serve this role in conventional wireless communications systems due to the narrow-band nature of most wireless standards. Cognitive radios, however, are agile and broadband in nature; the RF front-end and digitizer are often exposed to scenarios where blockers can be up to 40 dB higher than the desired channel power. The specifications for the baseband blocks (filter and digitizer) in cognitive wireless applications are very demanding and hard to design with reasonable amount of power.

Embodiments of the present disclosure use a design making the cognitive radio architecture more tolerant to intentional and unintentional jammers through a mixed-mode spread-spectrum approach. Both in-band and out-of-band interferences are drastically attenuated. Embodiments of the present disclosure can be implemented in the analog domain at intermediate or baseband frequencies where linear feedback achieving outstanding performance is still possible. In an embodiment, a precise and highly reproducible pseudo randomizer based on a digitally controlled programmable gain amplifier allows spreading the power of blockers and compressing the information in the desired channel, thereby taking full advantage of the high performance analog filtering as the resolution and power of the digitizer are relaxed. In an embodiment, a modulation technique limits the impact of the mixed-mode spreading on adjacent and out-of-band users, leading to improvements over 10 dB in both blocker rejection and signal-to-noise ratio.

In an embodiment, the use of mixed-mode spread-spectrum techniques in front of the RF mixer spread the energy of the signal in a wider band. However, it is equally relevant that the pseudo random signal used for this purpose serve as a signal identification key. In the receiver, the desired information can be de-spread (narrowed), while the jammer's power can be spread in a wider frequency band. Thus, in an embodiment, narrow baseband filtering efficiently removes most of the blockers, while preserving the desired information.

In an embodiment, blocker rejection improves with the spreading factor. The spreading signal can be selected to reduce signal amplitude, thereby relaxing the dynamic range requirements for the baseband blocks and digitizer. The bandwidth required by the mixed-mode spread spectrum operation can be minimized to make the architecture more attractive. In an embodiment, the resulting cognitive radio architecture shows superior blocker tolerance when compared to existing systems, and these techniques can also be used in radars and other networks, making them more reliable and robust.

According to the 2012 President's Council of Advisors on Science and Technology report, up to 1 GHz could be shared for unlicensed low-power local area networks that must co-exist with neighbor networks and high power primary users. The global business impact of the spectrum sharing initiative by 2020 was estimated in $4.5 trillion. The availability of up to 1 GHz bandwidth open unlimited opportunities for new applications. Spectrum observation and agile transceiver architectures with superior interference tolerance will make possible the long wanted spectrum sharing of unlicensed wireless networks. Embodiments of the present disclosure will have a significant impact on the consumer electronics sector and homeland security radars, as evidenced in recent research efforts.

2. EXEMPLARY TRANSCEIVER

Figure 1:
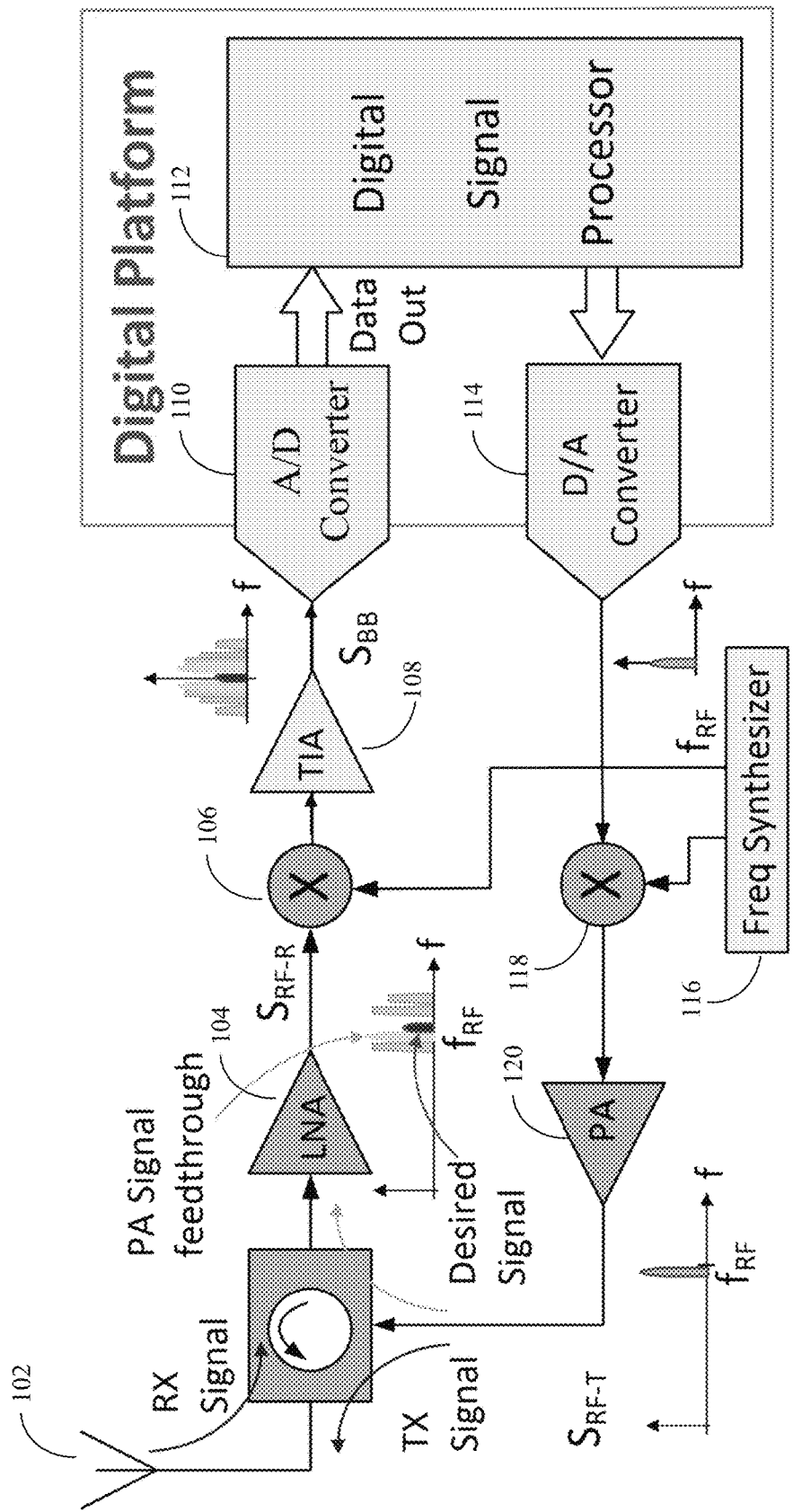
FIG. 1 is a diagram of an exemplary transceiver.

FIG. 1 is a diagram of an exemplary transceiver. In FIG. 1, digital signal processor (DSP) 112 outputs a signal to digital-to-analog converter (DAC or D/A converter) 114. The output signal from DAC 114 is up converted to a reference frequency (fRF) by a radio frequency (RF) mixer 118, which is synthesized by frequency synthesizer 116. The signal from frequency synthesizer 116 is amplified by a power amplifier (PA) 120, and the resulting output from PA 120 is transmitted from an antenna 102, which can also receive a signal.

In an embodiment, the received signal, as well as the leakage signal from PA 120, is amplified by a low-noise amplifier (LNA) 104 and down-converted by a receiver RF mixer 106 and trans-impedance amplifier (TIA) 108. The base-band signal is filtered by the transimpedance amplifier (TIA) 108 or a low-pass filter and then fed to an analog-to-digital converter (ADC) 110.

In an embodiment, the worst-case scenario for broadband receivers is when the incoming signal power is huge due to very strong in-band and out-of-band blockers that may even saturate LNA 104, causing the receiver to saturate. Fixed surface acoustic wave or bulk acoustic wave filters can help attenuate the out-of-band blockers if placed before LNA 104. However, in an embodiment, these devices cannot be programmed to cover different frequency bands. For multi-band applications, as an alternative, narrow-band filter banks could be allocated. Even if this option is feasible, the presence of in-band and strong near-band blockers demand a huge dynamic range from all the receiver chain components—LNA 104, RF-mixer 106, and TIA 108. The transceiver of FIG. 1 does nothing to suppress RX interference prior to ADC 110 (at which point information is permanently lost). Further, the transceiver of FIG. 1 is not robust to operation in an unregulated and/or opportunistic environment.

3. EXEMPLARY DIGITAL SPREAD SPECTRUM

Figure 2:
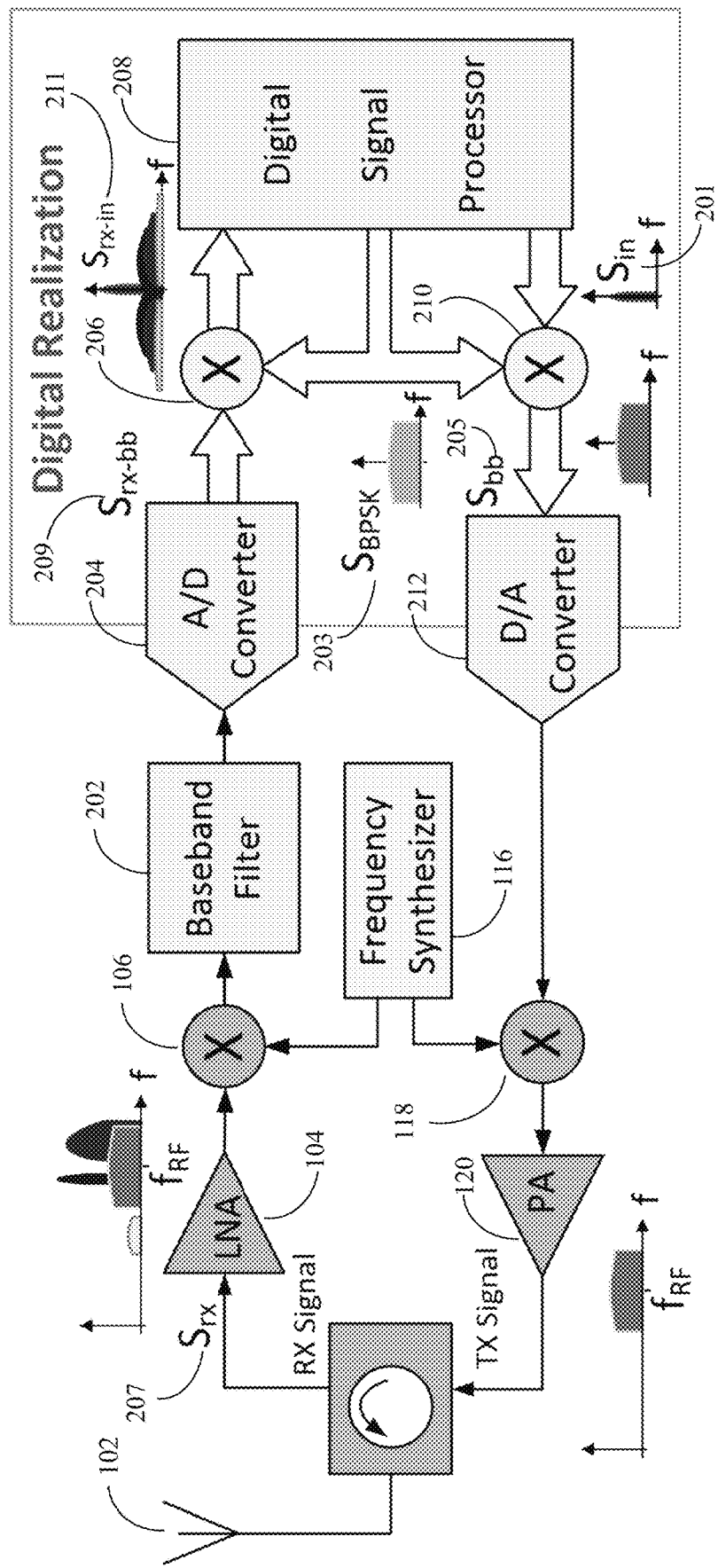
FIG. 2 is a diagram of a transceiver using a digital spread spectrum approach in accordance with an embodiment of the present disclosure.

In spread spectrum communications, the signal can be convolved with a wideband digital PRBS that spreads desired signal power over a bandwidth equal to signal bandwidth plus PRBS bandwidth. FIG. 2 is a diagram of a transceiver using a digital spread spectrum approach in accordance with an embodiment of the present disclosure.

In an embodiment, PRBS signals use a much wider band than the information they are carrying, as depicted in FIG. 2. In FIG. 2, the spectrum of the signal $S_{in}$ 201 from DSP 208 is spread through a binary pseudo random $S_{BPSK}$ 203, using mixer 210, to produce signal $S_{bb}$ 205. In the time domain, an equation for $S_{bb}$ 205 can be characterized as:

$$s_{bb} = s_{BPSK}(t) \cdot s_{in}(t) \qquad (1)$$

In an embodiment, $S_{bb}$ 205 is converted into an analog format by DAC 212, up-converted by RF mixer 118, amplified by RF power amplifier 120, and then transmitted via antenna 102. The received signal $S_{rx}(t)$ 207 includes the desired signal, as well as in-band and out-of-band interferers. In an embodiment, at the base-band, higher frequency interferers can be removed using a baseband filter 202, but in-band undesired signals and close interferers are not even attenuated. After base-band filter 202, the received information is converted into digital format by a high-resolution ADC 204 and mixed by mixer 206. Ignoring the ADC quantization noise, the received signal $S_{rx\text{-}bb}$ 209 after ADC 204 can be described as:

$$S_{rx\text{-}bb}(t) = s_{bb}(t-t_0) + v_{noise} \qquad (2)$$

In equation (2), $v_{noise}$ stands for the noise and blockers that are not filtered by the precedent filter (e.g., baseband filter 202). In an embodiment, the bandwidth of ADC 204 must be wide enough to accommodate the desired information, as well as the blockers power. In an embodiment, this can be a significant overhead, since wideband and high resolution ADCs are expensive in terms of power, silicon area, and complexity. In an approximation, an ADC's power consumption can increase by a factor of 4 for every additional resolution bit, since both quantization noise and thermal noise are reduced by a factor of 2.

In an embodiment, after $S_{rx\text{-}bb}$ 209 is converted into digital format by ADC 204, it convolves with the PRBS (e.g., using mixer 206 and/or DSP 208) to recover the information. In an embodiment, the information that was convolved in the transmitter with the PRBS is now de-spread (compressed) into the original bandwidth of $S_{in}$ 201. In an embodiment, signals that are uncorrelated with PRBS are spread over wider bandwidth. In an embodiment, most of the power falls out of desired signal frequency range and can be removed employing a digital filter. The digital signal $S_{rx\text{-}in}$ 211 after the receiver convolution can be expressed as:

$$S_{rx\text{-}in}(t) = s_{BPSK}(t-t_1) \cdot \{s_{BPSK}(t-t_0) \cdot s_{in}(t-t_0) + v_{noise}\} \qquad (3)$$

In equation (3), it is assumed that the received signal arrives at $t=t_0$ secs, and the estimated delay time after handshaking procedure at the receiver side is $t_1$ secs. In an embodiment, if the $S_{BPSK}$ 203 sequence received is synchronized with the receiver pseudo random sequence ($t_0=t_1$), then the low-frequency components can be found as:

$$S_{rx\text{-}in}(t) = \{s_{BPSK}(t-t_0)\}^2 \cdot s_{in}(t-t_0) + s_{BPSK}(t-t_0) \cdot v_{noise}\} \qquad (4)$$

After ADC 204, the auto-correlation of $S_{BPSK}$ 203 is ideally unity, leading to the desired signal, while at the same time the energy of the uncorrelated blockers and noise $V_{noise}$ is spread over wider frequency range, which is a major benefit of this technique. In an embodiment, a 1:10 ratio between the desired signal and PRBS bandwidths pushes up to 90% of in-band blocker energy to out-of-band after the spectrum spreading operation. In an embodiment, the wider the PRBS bandwidth, the more effective is the frequency spreading of the blocker power. Therefore, the spread spectrum process employing PRBS signals allows signal identification in the presence of interferers even if allocated over the same frequency band, as long as those interferers are uncorrelated with the PRBS. In an embodiment, spread spectrum systems are able to co-exist with other users that are sharing the same spectrum, provided that the used pseudo random sequences are orthogonal among them; e.g., the cross correlation among different orthogonal PRBS signals is zero. Notice the correlation of a PRBS signal with a time delay version of the same sequence is zero. This provides a resilience to the leakage signal from PA 120, as well as other intentional jammers that may track the PRBS modulating signal.

4. EXEMPLARY MIXED-SIGNAL BLOCKER-RESILIENT BROADBAND TRANSCEIVER

An important objective of cognitive radio technology is to facilitate sharing of spectra between various users and/or services without causing significant interference. Due to the current limitations of spectra sensing devices, significant interferences (e.g., collisions) of secondary users can be expected to occur among themselves and with primary users. In an embodiment, transmit power of secondary users should be limited so as to not interfere with primary user communication, and secondary communication systems should co-exist with neighbor networks and primary users that will share the same bandwidth.

Figure 3:
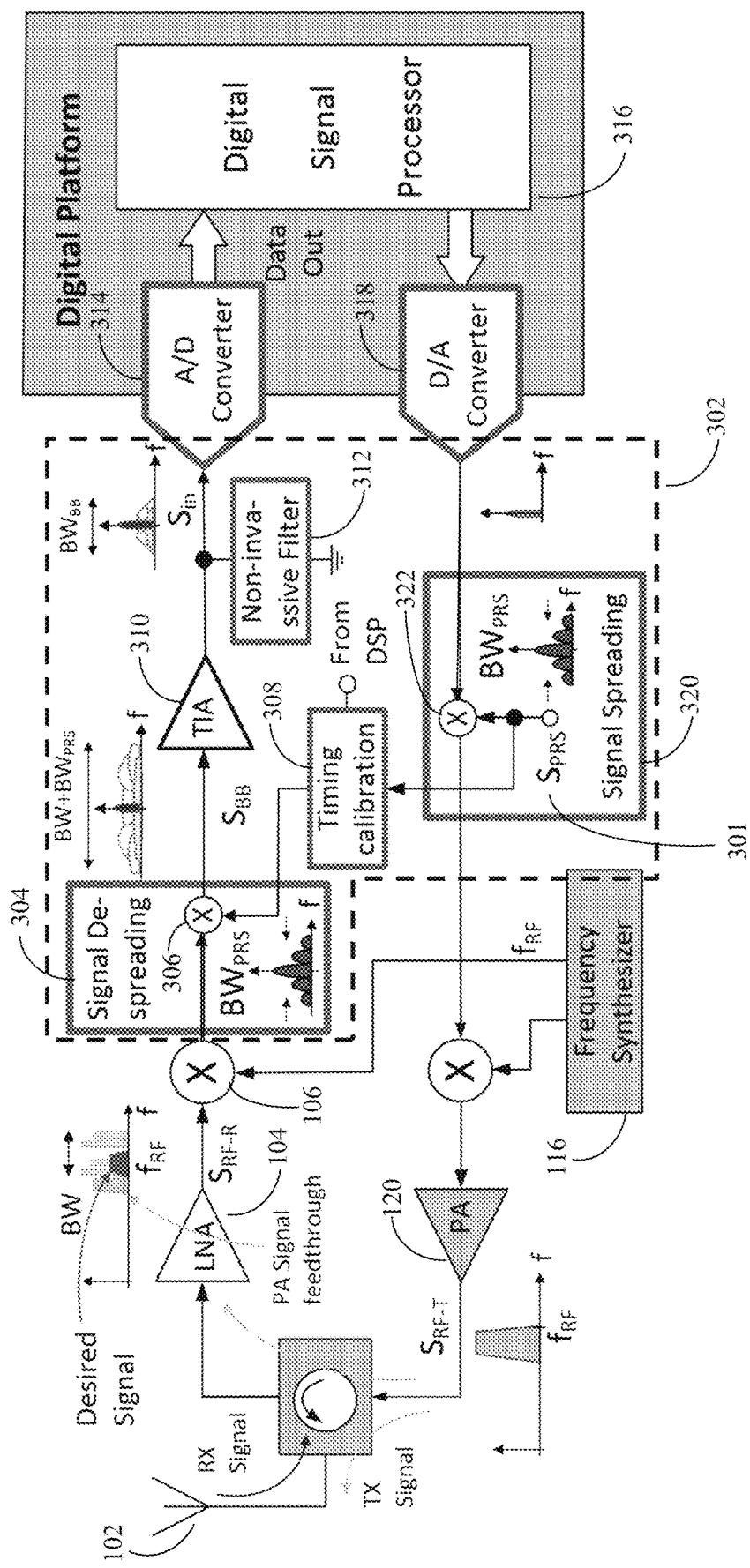
FIG. 3 is a diagram of an exemplary mixed-signal blocker-resilient broadband transceiver in accordance with an embodiment of the present disclosure.

FIG. 3 is a diagram of an exemplary mixed-signal blocker-resilient broadband transceiver in accordance with an embodiment of the present disclosure. The transceiver of FIG. 3 is able to co-exist with neighbor networks. Moreover, secondary users can even tolerate the presence of the primary user, provided that the front-end blocks in the transmit (TX) section can properly manage the incoming signal power. FIG. 3 includes signal spreading and de-spreading system 302 that advantageously spreads and de-spreads signal(s) before digitization (i.e., in analog). Using spreading and de-spreading analog circuitry has several advantages over performing spreading and de-spreading operations digitally (e.g., using DSP 316). For example, by spreading and de-spreading signal(s) before digitization, embodiments of the present disclosure can reduce dynamic range requirements of circuitry (e.g., of ADC 314). Spreading and de-spreading signal(s) in analog in accordance with embodiments of the present disclosure enables gradual changes in signals, reduced bandwidth, and more efficient signal processing.

In an embodiment, the transceiver architecture in FIG. 3 is based on a dual-modulation system, in which a mixed-mode spread-spectrum technique is employed (e.g., using signal spreading and de-spreading system 302) in the baseband domain utilizing a pseudo-random sequence (PRS). In an embodiment, a pseudorandom sequence (PRS) spreads a signal on transmit. In an embodiment, despreading the signal in the RX IF section collapses the signal bandwidth while spreading in-band interferers. In an embodiment, this PRS sequence is not binary. For example, in an embodiment, DSP 316 outputs a digital signal to be transmitted, which is converted into analog by DAC 318. After being conditioned in the digital domain, the signal to be transmitted is first convolved with a broadband PRS signal $S_{PRS}$ 301 generated (or, in an embodiment, received) by signal spreader 320 to spread the spectrum before it is up-converted (e.g., using mixer 322) and transmitted by PA 120. In an embodiment, the bandwidth of the signal $S_{PRS}$ 301 is broader than the bandwidth of the signal to be transmitted (e.g., by antenna 102) to take full advantage of the large shared spectra available in cognitive radio systems.

In an embodiment, the signal from LNA 104 and mixer 106 is sent to signal de-spreader 304 to de-spread the spectrum before it is downconverted (e.g., using mixer 306), amplified by transimpedance amplifier (TIA) 310, and sent to ADC 314. In an embodiment, de-spreader 304 collapses the signal bandwidth while spreading in-band interferers. In an embodiment, mixers 306 and 322 receive a reference signal based on $S_{PRS}$ 301. For example, mixer 322 receives $S_{PRS}$ 301 as a reference signal to mix with the output of DAC 318. In FIG. 3, $S_{PRS}$ 301 is input to a timing calibrator 308, which generates a calibrated signal based on $S_{PRS}$ 301 and outputs the calibrated signal as a reference signal to mixer 306 to mix with the output of mixer 106.

For example, in an embodiment, the calibrated signal generated by timing calibrator 308 is a delayed signal generated based on $S_{PRS}$ 301. In an embodiment, the delay in the calibrated signal compensates for delay in travel time of the signal so that mixers 306 and 322 are synchronized. In an embodiment, timing calibrator 308 generates a plurality of different signals based on $S_{PRS}$ 301 and outputs these calibrated signals to multiple respective mixers in signal de-spreader 304 (e.g., as illustrated by FIGS. 7A-7D). In an embodiment, multiple mixers can be used in multiple correlation circuits in signal de-spreader 304 (e.g., to find a correct delay to synchronize mixer 306 with mixer 322 faster and/or to send multiple signals to separate receivers). In an embodiment, a timing signal used by timing calibrator 308 comes from DSP 316. In an embodiment, the amplified signal from TIA 310 is filtered by non-invasive filter 312 prior to being sent to ADC 314.

Elements of FIG. 3 can be implemented using a single device or a combination of devices. For example, in an embodiment, signal spreading and de-spreading system 302 and/or all elements of FIG. 3 are implemented using a single device (e.g., a chip). In an embodiment, signal spreading and de-spreading system 302 and/or all elements of FIG. 3 are implemented using separate devices. In an embodiment, signal spreading and de-spreading system 302 and/or all elements of FIG. 3 can be integrated into a host device (e.g., an antenna system and/or other communications system).

5. EXEMPLARY FREQUENCY-EFFICIENT PSEUDO-RANDOM SEQUENCE

In an embodiment, the PRBS signal used in digital communication systems employs edge sensitive flip-flops and logical gates in the feedback path. Although very hardware efficient, the resulting binary level pseudo random sequence can demand excessive bandwidth. Binary sequences are very rich in harmonics, and signal energy can extend out to 6-7 times the clock frequency before it falls −30 dB under the power of the first spectral lobe.

FIG. 4 is a diagram of an exemplary spectrum of a pseudo-random signal in accordance with an embodiment of the present disclosure. In FIG. 4, the first null of the spectrum is located at $1/T_b$, where $T_b$ is the time duration of the bit. As a result, the convolution of the PRBS and the desired information can demand excessive bandwidth that may not satisfy mask requirements of conventional wireless communication standards. For example, for WCDMA, adjacent channel leakage must be −30 dB under the main channel power level. In an embodiment, a very demanding linear phase filter used to limit bandwidth can be used, but it must operate at very high frequencies. To make practical the analog spread spectrum approach, embodiments of the present disclosure include a mixed-mode pseudo random signal that maintains the properties of the PRBS with limited bandwidth.

In an embodiment, the pseudo-random signal is replicated at both TX and RX and timely synchronized after the handshaking procedure. In an embodiment, the PRBS waveform is rounded if its high frequency components are removed, limiting its bandwidth. Analog filtering can achieve this goal, but the resulting signal becomes fully analog, making it very difficult to accurately replicate it at the RX section. Finite Impulse Response (FIR) filters can be employed as well, but the system becomes more complex and power consumption increases. Embodiments of the present disclosure use systems and methods based on the functionality and properties of the PRBS. In an embodiment, several synchronized clock phases that are aligned with the PRBS are interpolated to make the signal transitions smoother. Applying a conventional PRS used in digital domain spread spectrum for RF interferer suppression would increase transmit bandwidth and increase size/weight/power for PA 120 and additional filtering. Embodiments of the present disclosure use an interpolated PRS that mitigates this issue.

FIG. 5 is a diagram of an exemplary modulator employing a pseudo-random mixer-mode sequence in accordance with an embodiment of the present disclosure. In FIG. 5, a master clock 502 (e.g., in an embodiment, the same clock used for the generation of the N-bit pseudo-random generator) is injected into a delay locked loop (DLL) 503 to generate N-delayed clocked signals 504. In an embodiment, DLL 503 generates N-clock phases with a delay between consecutive outputs that correspond to $T_{ck}/N$ seconds, where $T_{ck}$ is the period of master clock 502. In an embodiment, the output of the conventional binary PRBS sequence is then replicated at each $C_{ki}$ output but spaced by $T_{ck}/N$ seconds. In an embodiment, when a PRBS transition happens, respective outputs of flip-flops 508 manipulate the gain of an agile digitally programmable gain amplifier (DPGA) 510 in a sequence to modulate an input signal 512 with a staircase like transition, rather than a pulse-like shape, to produce modulated output signal 514. The embodiment of FIG. 5 utilizes digital circuits, and the only analog part resides in DPGA 510.

In an embodiment, to improve system accuracy, DPGA 510 can be a thermometric current steering DPGA. In an embodiment, replicas of core current sources can be used, and matching better than 1% can be guaranteed. Therefore, better than 1% matching between TX randomizers and RX randomizers can be guaranteed in accordance with embodiments of the present disclosure. Mismatches between the absolute values of the current sources used in TX and RX are not relevant since those will appear as gain errors and will not degrade system performance.

In an embodiment, the modulator of FIG. 5 can be used to implement some or all of the functionality of elements of signal spreader 320 and/or timing calibrator 308. For example, in an embodiment, input signal 512 is the RF signal from DAC 318. In an embodiment, output signal 514 is the output of mixer 322 (e.g., input to mixer 118). In an embodiment, flip flops 508 (and/or, in an embodiment DPGA 510) generate a PRS in accordance with an embodiment of the present disclosure. For example, in an embodiment flip flops 508 (and/or in an embodiment DPGA 510) generate $S_{PRS}$ 301. For example, in an embodiment, the output of flip flops 508 (and/or an output from DPGA 510 before the signal is mixed with input signal 512) is input, as $S_{PRS}$ 301 to timing calibrator 308 to generate a calibrated signal to send to mixer 306.

In an embodiment, the number of flip flops 508 can be changed to vary the number of levels in $S_{PRS}$ 301 (e.g., as discussed below with reference to FIG. 6). For example, in an embodiment, 4 flip flops 508 will generate a multi-level linearly interpolated pseudo-random sequence (PRS) comprising 5 levels. In an embodiment, the number of levels in the PRS generated by flip flops 508 is equal to N+1, where N is the number of flip flops 508 used to generate the PRS (e.g., $S_{PRS}$ 301). In an embodiment, the height of the PRS signal (e.g., $S_{PRS}$ 301) (and/or each level in a multi-level linearly interpolated PRS) is determined by DPGA 510.

FIG. 6 is a diagram showing exemplary waveforms for a conventional pseudo-random binary sequence (PRBS) 604 and for a multi-level linearly interpolated pseudo-random sequence (PRS) 606 in accordance with an embodiment of the present disclosure. In an embodiment, PRS 602 is the same signal as $S_{PRS}$ 301. To quantify the benefits of a multi-level linearly interpolated PRS 606 in accordance with an embodiment of the present disclosure, let us compare its spectrum with the one of the conventional PRBS 604 and sinusoidal PRS 602. In FIG. 6, conventional PRBS 604 shows very sharp transitions. In FIG. 6, linearly interpolated PRS 606 in accordance with an embodiment of the present disclosure has five levels interpolated and makes the transition between levels smoother by employing evenly distributed steps. As discussed above, in an embodiment, the number of flip flops 508 can be changed to vary the number of levels in linearly interpolated PRS 606.

In an embodiment, if needed, more discrete levels can be generated at the expense of more complexity, more power consumption, and additional silicon area. In an embodiment, fast flip-flops 508, and DPGA 510 in case of broadband applications are used. The 10%-90% transition time for those devices, for instance, in the case of a 100 MHz clock (period of 10 nsecs) used in PRS, requires a device to be in the range of 1 nsec/step if 10 steps per transition are interpolated. This is certainly possible in deep submicron technologies.

FIG. 6 shows the spectrum of the conventional binary pseudo random sequence 604 and the pseudo random sequence 606 with five equally spaced levels interpolated. The levels used are {Vpk, 0.6 Vpk, 0.2 Vpk, −0.2 Vpk, −0.6 Vpk and −Vpk} and emulates a discrete ramp. The second, third and fourth spectral lobes present in the conventional PRBS case show frequency bands with power levels well above the −33 dB limit required by many standards, such as WCDMA. For the case of PRS with evenly spaced interpolated levels, the neighbor lobes are attenuated by 15 dB compared with the conventional PRBS case. The second, third, and fourth lobes are under −30 dB compared with the power of the main lobe. Better adjacent channel rejection is obtained if more levels are interpolated.

6. EXEMPLARY CMOS IMPLEMENTATION

FIGS. 7A-7D are diagrams illustrating an exemplary complementary metal-oxide-semiconductor (CMOS) implementation of an embodiment of the present disclosure. In an embodiment, the CMOS implementation of FIG. 7A is a 40 nm CMOS implementation. In FIG. 7A, the baseband output $S_{BB}$ 701 from mixer 106 is mixed (via mixers 702) with three different signals. For example, in an embodiment, mixers 702 are included in signal de-spreader 304. The respective output signals from mixers 702 are sent to respective matched filters 704 and are converted to digital by respective ADCs 706 to provide signals with three different digital ranges.

For example, as discussed above, in an embodiment, multiple mixers 702 can be used in multiple correlation circuits in signal de-spreader 304 (e.g., to find a correct delay to synchronize mixers 702 with mixer 322 faster and/or to send multiple signals to separate receivers). In an embodiment, respective delays input into mixers 702 can be pre-programmed or dynamically configured (e.g., by a controller or a user). In an embodiment, delays can be dynamically configured by circuitry in signal spreader 320, signal de-spreader 304, and/or timing calibrator 308 in accordance with an embodiment of the present disclosure. For example, in an embodiment, signal spreader 320, signal de-spreader 304, and/or timing calibrator 308 can include circuitry to introduce and/or modify $S_{PRS}$ 301 to introduce delays.

In FIG. 7B, a transmitting device (e.g., in an embodiment, DSP 316) generates a sine wave 708. In an embodiment, sine wave 708 is scrambled with the PRS (e.g., by mixer 322), as shown by diagram 712. In FIG. 7C, the signal comes back to the RX side, but with an interfering tone (at a 2 MHz offset), as illustrated by diagram 714. In FIG. 7D, mixers 702 correlate the received signal with the PRS at the right offset corresponding to the round trip time to recover the original tone and scramble the interferer, as illustrated by diagram 716.

7. EXEMPLARY METHODS

FIG. 8 is an exemplary method for de-spreading a received signal using a multi-level linearly interpolated PRS in accordance with an embodiment of the present disclosure. In step 802, a multi-level linearly interpolated PRS is received. For example, in an embodiment, mixer 322 receives a multi-level linearly interpolated PRS $S_{PRS}$ 301. In step 804, a calibrated signal is generated based on the PRS. For example, in an embodiment, timing calibrator 308 generates a calibrated signal based on the multi-level linearly interpolated PRS $S_{PRS}$ 301. In step 806, a received signal is received. For example, in an embodiment, a combined received signal is received from antenna 102 and PA 120. In step 808, a de-spread signal is generated based on the received signal and the calibrated signal. For example, in an embodiment, mixer 306 receives the calibrated signal from timing calibrator 308 and a downcoverted version of the received signal from mixer 106 and generates the de-spread signal.

8. EXEMPLARY ADVANTAGES

As discussed above, embodiments of the present disclosure have several advantages over conventional systems. For example, embodiments of the present disclosure reduce the impact of spectrum sharing. Further, embodiments of the present disclosure extend the advantages of spread-spectrum to the receiver and ADC. Embodiments of the present disclosure also advantageously provide resilience to the co-site interference. Embodiments of the present disclosure introduces robust modulation approaches for efficient spectrum sharing. Further, embodiments of the present disclosure greatly reduce size, weight, and power (SWaP) requirements when compared to traditional transceiver architecture (designed to have the same amount of RX dynamic range).

9. CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A transceiver, comprising:
a signal spreader configured to spread a spectrum of a first signal using a pseudo-random sequence (PRS), thereby generating a spread signal;
upconversion circuitry coupled to the signal spreader, wherein the upconversion circuitry is configured to upconvert the spread signal, thereby generating an upconverted signal;
downconversion circuitry, coupled to the upconversion circuitry, wherein the downconversion circuitry is configured to downcovert a second signal comprising the upconverted signal and a received signal, thereby generating a downconverted signal;
an analog signal de-spreader, coupled to the downconversion circuitry, wherein the analog signal despreader is configured to collapse a bandwidth of the downconverted signal while spreading in-band interferers in the downconverted signal;
an analog to digital converter (ADC) coupled to an output of the analog signal de-spreader; and
a timing calibrator coupled to the signal spreader and the analog signal de-spreader, wherein the timing calibrator is configured to:
receive the PRS,
generate, based on the PRS, a calibrated signal, wherein the calibrated signal is a delayed version of the PRS, and wherein a delay of the calibrated signal is configured such that the signal spreader is synchronized with the analog signal de-spreader, and
transmit the calibrated signal directly to the analog signal de-spreader.

2. The transceiver of claim 1, wherein a bandwidth of the PRS is broader than a bandwidth of a signal to be transmitted by an antenna of the transceiver.

3. The transceiver of claim 1, wherein the signal spreader comprises a first mixer, wherein the analog signal de-spreader comprises a second mixer, wherein the first mixer is configured to mix the PRS with the first signal, and wherein the second mixer is configured to mix the downcoverted signal with the calibrated signal.

4. The transceiver of claim 1, wherein the timing calibrator is further configured to:
generate a plurality of calibrated signals based on the PRS, wherein the plurality of calibrated signals are respective versions of the PRS with different delays; and
transmit the plurality of calibrated signals to the analog signal de-spreader.

5. The transceiver of claim 4, wherein the analog signal de-spreader comprises a plurality of mixers, and wherein the plurality of mixers are configured to mix respective calibrated signals in the plurality of calibrated signals with the downconverted signal, thereby generating respective de-spread signals with different ranges.

6. The transceiver of claim 1, further comprising a tran-simpedance amplifier (TIA) coupled to an output of the analog signal de-spreader and to an input of the ADC.

7. The transceiver of claim 6, further comprising a non-invasive filter coupled to an output of the TIA and to the input of the ADC, wherein the ADC is coupled to a digital signal processor (DSP).

8. The transceiver of claim 7, wherein the signal spreader is coupled to an output of a digital-to-analog converter (DAC), wherein the DAC is coupled to the DSP, and wherein the DAC is configured to transmit the first signal to the signal spreader.

9. The transceiver of claim 1, wherein the PRS is a multi-level linearly interpolated PRS.

10. The transceiver of claim 9, wherein the PRS comprises three levels.

11. A transceiver, comprising:
a first analog mixer, configured to:
receive a first signal and a multi-level linearly interpolated pseudorandom sequence (PRS), wherein the PRS comprises at least three levels, and
generate a spread signal by spreading a spectrum of the first signal using the PRS;
a timing calibrator, coupled to the first analog mixer, wherein the timing calibrator is configured to:
receive the PRS, and
generate, based on the PRS, a calibrated signal, wherein the calibrated signal is a delayed version of the PRS; and
a second analog mixer, coupled to an output of the timing calibrator, wherein the second analog mixer is configured to:
receive the calibrated signal directly from the timing calibrator, wherein a delay of the calibrated signal is configured such that the first analog mixer is synchronized with the second analog mixer,
receive a second signal, wherein the second signal comprises a received signal and the first signal, and
generate a de-spread signal based on the second signal and the calibrated signal.

12. The transceiver of claim 11, wherein the PRS comprises five equally spaced interpolated levels with evenly distributed steps between levels.

13. The transceiver of claim 11, wherein the timing calibrator is further configured to generate a second calibrated signal based on the PRS.

14. The transceiver of claim 13, further comprising a third analog mixer, coupled to the output of the timing calibrator, wherein the third analog mixer is configured to:
receive the second calibrated signal and the second signal, and
generate a second de-spread signal based on the second signal and the second calibrated signal.

15. A transceiver, comprising:
a signal spreader configured to spread a spectrum of a first signal using a pseudo-random sequence (PRS), thereby generating a spread signal;
an analog signal de-spreader, coupled to the signal spreader, wherein the analog signal despreader is configured to collapse a bandwidth of the spread signal while spreading in-band interferers in the spread signal; and
a timing calibrator coupled to the signal spreader and the analog signal de-spreader, wherein the timing calibrator is configured to:
receive the PRS,
generate, based on the PRS, a calibrated signal, wherein the calibrated signal is a delayed version of the PRS, and wherein a delay of the calibrated signal is configured such that the signal spreader is synchronized with the analog signal de-spreader, and
transmit the calibrated signal directly to the analog signal de-spreader.

16. The transceiver of claim 15, further comprising:
upconversion circuitry coupled to the signal spreader, wherein the upconversion circuitry is configured to upconvert the spread signal, thereby generating an upconverted signal.

17. The transceiver of claim 16, further comprising:
downconversion circuitry, coupled to the upconversion circuitry and the analog signal de-spreader, wherein the downconversion circuitry is configured to downcovert a second signal comprising the upconverted signal and a received signal, thereby generating a downconverted signal, and wherein the analog signal despreader is configured to collapse a bandwidth of the downconverted signal while spreading in-band interferers in the downconverted signal.

18. The transceiver of claim 15, further comprising:
an analog to digital converter (ADC) coupled to an output of the analog signal de-spreader.

19. The transceiver of claim 15, wherein the signal spreader comprises:
an analog mixer, configured to:
receive the first signal and the PRS, and
generate the spread signal by spreading the spectrum of the first signal using the PRS.

20. The transceiver of claim 19, wherein the PRS comprises three levels.

* * * * *